(12) United States Patent
Leach et al.

(10) Patent No.: US 11,771,931 B2
(45) Date of Patent: Oct. 3, 2023

(54) TREE SADDLE

(71) Applicant: Latitude Outdoors, LLC, Grand Rapids, MI (US)

(72) Inventors: Kevin Leach, Grand Rapids, MI (US); Alex Chopp, Royal Oak, MI (US); Jake Matelic, Royal Oak, MI (US)

(73) Assignee: Latitude Outdoors, LLC, Grand Rapids, MI (US)

( * ) Notice: Subject to any disclaimer, the term of this patent is extended or adjusted under 35 U.S.C. 154(b) by 0 days.

(21) Appl. No.: 17/361,637

(22) Filed: Jun. 29, 2021

(65) Prior Publication Data

US 2022/0249886 A1     Aug. 11, 2022

Related U.S. Application Data

(60) Provisional application No. 63/147,530, filed on Feb. 9, 2021.

(51) Int. Cl.
*A62B 35/00* (2006.01)
*A01M 31/02* (2006.01)

(52) U.S. Cl.
CPC ......... *A62B 35/0012* (2013.01); *A01M 31/02* (2013.01); *A62B 35/0025* (2013.01); *A62B 35/0031* (2013.01)

(58) Field of Classification Search
CPC ............ A62B 35/0012; A62B 35/0031; A62B 35/0018; A62B 35/0025; A62B 35/0006; A41F 1/002; A45C 13/1069; A01M 31/02
See application file for complete search history.

(56) References Cited

U.S. PATENT DOCUMENTS

| | | | | |
|---|---|---|---|---|
| 1,903,081 A | * | 3/1933 | Wotherspoon | A41F 9/002 D29/101.1 |
| 2,254,179 A | * | 8/1941 | Hoyt | A62B 35/0012 182/7 |
| 3,757,893 A | * | 9/1973 | Hobbs | A62B 35/0037 182/6 |
| 4,318,502 A | * | 3/1982 | Lowe | A45F 3/04 224/642 |
| 4,347,914 A | * | 9/1982 | Gary | A45F 3/26 182/7 |
| 4,396,091 A | * | 8/1983 | Anderson | A01M 31/02 224/184 |

(Continued)

*Primary Examiner* — Daniel P Cahn
*Assistant Examiner* — Shiref M Mekhaeil
(74) *Attorney, Agent, or Firm* — Price Heneveld LLP

(57) ABSTRACT

A tree saddle includes a first panel having first and second ends with a body portion disposed therebetween, and a second panel having first and second ends with a body portion disposed therebetween. One or more connecting members operably couple the first and second panels to one another. A magnetic coupling system includes a first magnetic array disposed on the first panel, and a second magnetic array disposed on the second panel. The first magnetic array is magnetically coupled to the second magnetic array when the tree saddle is in a coupled condition. The first magnetic array is uncoupled from the second magnetic array when the tree saddle is in an uncoupled condition. The tree saddle includes a first profile when the tree saddle is in the uncoupled condition that is greater than a second profile of the tree saddle when the tree saddle is in the coupled condition.

5 Claims, 10 Drawing Sheets

(56) References Cited

U.S. PATENT DOCUMENTS

| | | | | |
|---|---|---|---|---|
| 4,399,595 A * | | 8/1983 | Yoon | A41F 1/002 24/303 |
| 4,687,074 A * | | 8/1987 | Green | A01M 31/02 182/3 |
| 5,010,850 A * | | 4/1991 | Sailer | A47D 13/086 182/7 |
| 6,364,412 B1 * | | 4/2002 | Crawford | A47C 3/0255 5/120 |
| 6,378,174 B1 * | | 4/2002 | Wong | A45C 13/1069 24/66.1 |
| 6,854,801 B2 * | | 2/2005 | Nussbaum | A47C 3/0255 297/279 |
| 7,051,836 B2 * | | 5/2006 | Green | A63B 27/00 182/7 |
| 7,063,185 B2 * | | 6/2006 | Green | A01M 31/02 182/7 |
| 7,178,185 B1 * | | 2/2007 | Nattler | A41D 15/04 2/84 |
| 7,455,593 B1 * | | 11/2008 | O'Neill | A63G 9/00 297/277 |
| 7,909,137 B2 * | | 3/2011 | Green | A62B 35/04 182/3 |
| 8,322,488 B2 * | | 12/2012 | Green | A01M 31/02 182/7 |
| 8,661,720 B2 * | | 3/2014 | Miller | G09F 3/201 40/300 |
| 9,162,091 B2 * | | 10/2015 | Kuhnert | A62B 35/0068 |
| 9,210,978 B1 * | | 12/2015 | Hunt | A45C 11/08 |
| 10,016,633 B2 * | | 7/2018 | Perner | A62B 35/0012 |
| 10,159,858 B2 * | | 12/2018 | Lopez | A62B 35/0006 |
| 11,122,844 B1 * | | 9/2021 | Coban | A41D 13/129 |
| 11,179,584 B2 * | | 11/2021 | Power, II | A01M 31/02 |
| 11,351,405 B2 * | | 6/2022 | Power, II | A01M 31/02 |
| 2005/0139419 A1 * | | 6/2005 | Green | A01M 31/02 182/3 |
| 2005/0192159 A1 * | | 9/2005 | Jackson | A45F 3/14 482/23 |
| 2010/0200329 A1 * | | 8/2010 | Johnson | A62B 35/0025 182/3 |
| 2015/0231422 A1 * | | 8/2015 | Perner | A62B 35/0012 182/3 |
| 2017/0291047 A1 * | | 10/2017 | Bouquier | A62B 35/0012 |
| 2018/0126195 A1 * | | 5/2018 | Lopez | A62B 35/0018 |
| 2018/0255889 A1 * | | 9/2018 | Trimble | F41H 5/08 |
| 2019/0192887 A1 * | | 6/2019 | Christianson | A62B 35/0006 |
| 2019/0269948 A1 * | | 9/2019 | Green Mullins | A62B 35/0018 |
| 2020/0114181 A1 * | | 4/2020 | Monahan | A62B 35/0031 |
| 2020/0324153 A1 * | | 10/2020 | Power, II | A47C 3/0255 |
| 2020/0398087 A1 * | | 12/2020 | Power, II | A62B 35/0012 |
| 2020/0398088 A1 * | | 12/2020 | Power, II | A62B 35/0025 |
| 2021/0023400 A1 * | | 1/2021 | Musakaev | A47C 1/00 |
| 2021/0101032 A1 * | | 4/2021 | Power, II | A62B 35/0012 |
| 2021/0178200 A1 * | | 6/2021 | Power, II | A62B 35/0012 |
| 2021/0178201 A1 * | | 6/2021 | Power, II | A01M 31/02 |
| 2021/0228923 A1 * | | 7/2021 | Power, II | A62B 35/0075 |
| 2021/0370999 A1 * | | 12/2021 | Filipovitz | B60J 1/2011 |

* cited by examiner

TREE SADDLE

CROSS-REFERENCE TO RELATED APPLICATIONS

This application claims priority to U.S. 63/147,530, filed on Feb. 9, 2021, entitled "TREE SADDLE," the disclosure to which is hereby incorporated herein by reference in its entirety.

FIELD OF THE DISCLOSURE

The present concept generally relates to a tree saddle, and more particularly, a tree saddle operably between coupled and uncoupled conditions using a magnetic array.

BACKGROUND OF THE DISCLOSURE

Support mechanism for supporting hunters from trees are known and can be bulky, rigid and limiting when mounted on a user. A flexible and adaptable tree saddle is desired to provide better mobility for a user.

SUMMARY OF THE DISCLOSURE

According to an aspect of the present disclosure, a tree saddle includes a first panel having first and second ends with a body portion disposed therebetween, and a second panel having first and second ends with a body portion disposed therebetween. One or more connecting members operably couple the first and second panels to one another. A magnetic coupling system includes a first magnetic array disposed on the first panel, and a second magnetic array disposed on the second panel. The first magnetic array is magnetically coupled to the second magnetic array when the tree saddle is in a coupled condition. The first magnetic array is uncoupled from the second magnetic array when the tree saddle is in an uncoupled condition. The tree saddle includes a first profile when the tree saddle is in the uncoupled condition that is greater than a second profile of the tree saddle when the tree saddle is in the coupled condition.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
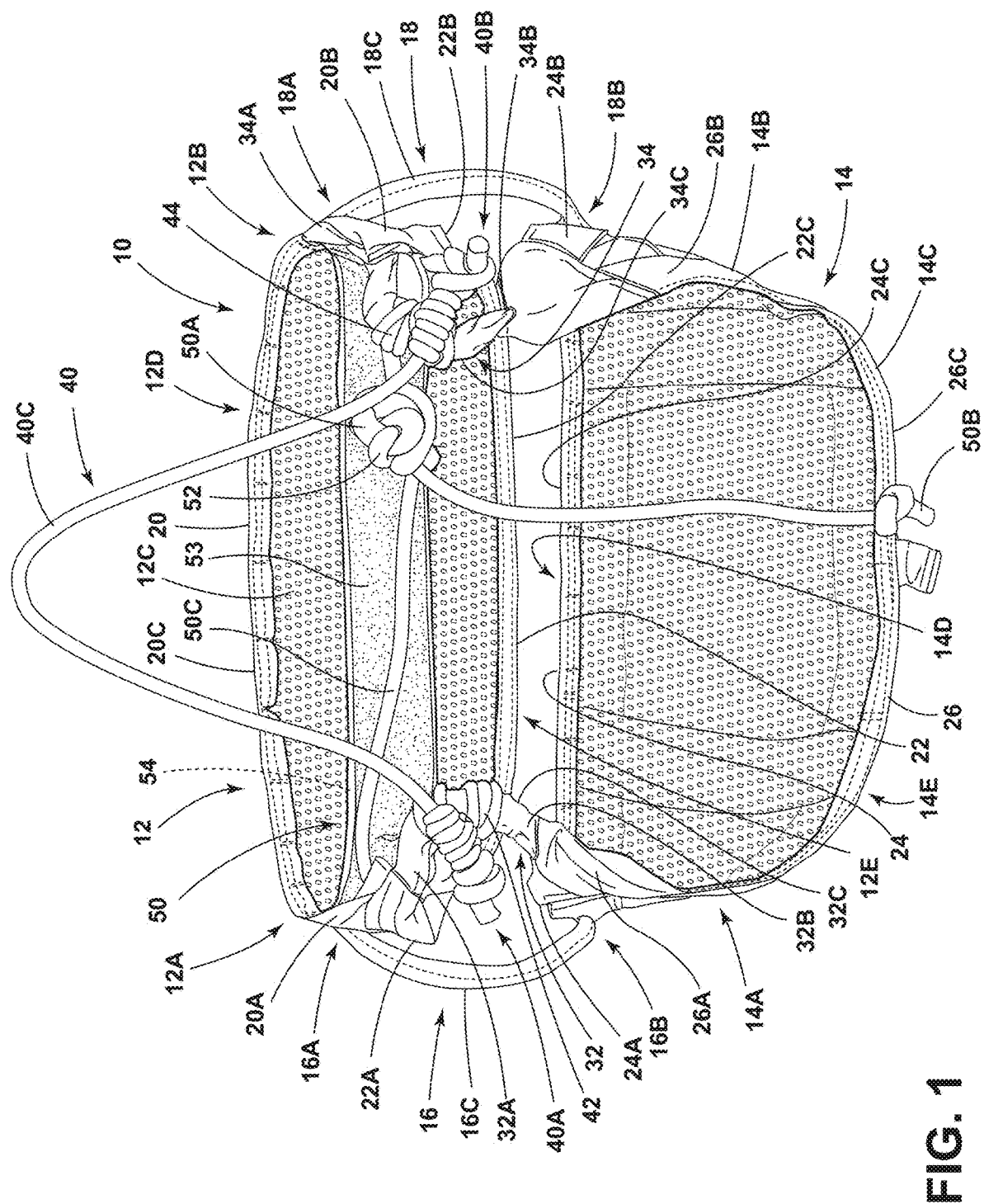
FIG. 1 is a front plan view of a tree saddle according to one embodiment of the present concept in an uncoupled and cinched condition.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the terms "coupled" and "uncoupled" may be used interchangeably with the terms "open" and "closed" to refer to a condition of the tree saddle, wherein parts of the tree saddle, or first and second panels of the tree saddle, are coupled to one another in the "coupled" or "closed" condition by magnets, and uncoupled from one another in the "uncoupled" or "open" condition, as further described below. As used herein, the terms "expanded" and "cinched" describe a condition of a tree saddle as lying flat and cinched around a user, respectively. As used herein, the terms "slacked" and "tightened" describe a condition of a belt member that can be loose or tightened around a user, and functions to create the expanded and cinched conditions of the tree saddle as a corollary when in the slacked and tightened conditions, respectively.

Referring now to FIG. 1, a tree saddle 10 is shown having first and second panels 12, 14 that are spaced-apart from one another in an uncoupled condition. The first and second panels 12, 14 are operably coupled to one another by first and second connectors 16, 18. The first and second connectors 16, 18 are flexible connectors made of a cloth material, which may include a nylon webbing or seatbelt material. As used herein, the term "seatbelt material" is used to describe a component part of a tree saddle that employs a webbing akin to a nylon seatbelt webbing, thereby providing suitable strength needed for the tree saddle applications. The first connector 16 includes first and second ends 16A, 16B with a body portion 16C disposed therebetween. The first end 16A of the first connector 16 is operably coupled to the first panel 12, and the second end 16B of the first connector 16 is operably coupled to the second panel 14. Similarly, the second connector 18 includes first and second ends 18A, 18B with a body portion 18C disposed therebetween. The first end 18A of the second connector 18 is operably coupled to the first panel 12, and the second end 18B of the second connector 18 is operably coupled to the second panel 14. The connections between the first and second connectors 16, 18 and the first and second panels 12, 14 may be provided by sewn connections disposed therebetween. The first and second connectors 16, 18 may include a stiffening member positioned within an interior thereof. In this way, the first and second connector 16, 18 are able to retain their general shape in a curved configuration as shown in FIG. 1, while still being flexible to accommodate mounting of the tree saddle 10, and relative movement of a user fitted with the tree saddle 10. Further, the first and second connectors 16, 18 may be comprised of material sections that are folded multiple times to provide enhanced rigidity, while still maintaining a suitable amount of flexibility. The folded material may also be provided in a casing comprised of a nylon material, or other suitable casing material.

With further reference to FIG. 1, the first panel 12 includes first and second ends 12A, 12B with a body portion 12C disposed therebetween. The body portion 12C of the first panel 12 may be comprised of a lightweight cloth material, which is both flexible and breathable, such as a mesh material. As shown in FIG. 1, the body portion 12C of the first panel 12 includes an upper perimeter portion 12D along which an upper reinforcement member 20 is provided. Further, the body portion 12C of the first panel 12 includes a lower perimeter portion 12E along which a lower reinforcement member 22 is provided. The upper and lower reinforcement members 20, 22 may comprise a seatbelt material which surrounds edges of the upper and lower perimeter portions 12D, 12E, respectively, on inner and outer surfaces of the first panel 12. The upper reinforcement member 20 includes first and second ends 20A, 20B with a body portion 20C disposed therebetween. Similarly, the lower reinforcement member 22 includes first and second ends 22A, 22B with a body portion 22C disposed therebetween. The first ends 20A, 22A of the upper and lower reinforcement members 20, 22 are coupled to one another, and further coupled to a first bridge member 32 at a first end 32A of the first bridge member 32. The second ends 20B, 22B of the upper and lower reinforcement members 20, 22 are also coupled to one another, and further coupled to a second bridge member 34 at a first end 34A of the second bridge member 34. The first and second bridge members 32, 34 each include body portions 32C, 34C disposed between respective first and second ends (32A, 32B and 34A, 34B) thereof. The first and second bridge members 32, 34 may be comprised of a seatbelt material and are used to interconnect the first and second panels 12, 14 in a flexible manner, as further described below. Rigidifying inserts or folded material may be provided with the first and second bridge members 32, 34 to help retain the shape of the members.

With further reference to FIG. 1, the second panel 14 includes first and second ends 14A, 14B with a body portion 14C disposed therebetween. The body portion 14C of the second panel 14 may be comprised of a lightweight cloth material, which is both flexible and breathable, such as a mesh material, or may include a more rigid polymeric material. As shown in FIG. 1, the body portion 14C of the second panel 14 includes an upper perimeter portion 14D along which an upper reinforcement member 24 is provided. Further, the body portion 14C of the second panel 14 includes a lower perimeter portion 14E along which a lower reinforcement member 26 is provided. The upper and lower reinforcement members 24, 26 of the second panel 14 may be comprised of a seatbelt material which surrounds edges of the upper and lower perimeter portions 14D, 14E, respectively, on inner and outer surfaces of the second panel 14. The upper reinforcement member 24 of the second panel 14 includes first and second ends 24A, 24B with a body portion 24C disposed therebetween. Similarly, the lower reinforcement member 26 of the second panel 14 includes first and second ends 26A, 26B with a body portion 26C disposed therebetween. The first ends 24A, 26A of the upper and lower reinforcement members 24, 26 of the second panel 14 are coupled to one another, and further coupled to the first bridge member 32 at the second end 32B of the first bridge member 32. The second ends 24B, 26B of the upper and lower reinforcement members 24, 26 of the second panel 14 are also coupled to one another, and further coupled to the second bridge member 34 at the second end 34B of the second bridge member 34. Thus, the first and second bridge members 32, 34 interconnect the first and second panels 12, 14, in a flexible manner at the first ends 20A, 22A and second ends 20B, 22B of the upper reinforcement members 20, 24, as well as the first ends 24A, 26A and second ends 24B, 26B of the lower reinforcement members 22, 26, respectively.

With further reference to FIG. 1, a bridge line 40 is provided having first and second ends 40A, 40B with a body portion 40C disposed therebetween. As shown in FIG. 1, the first and second ends 40A, 40B of the bridge line 40 are respectively coupled to the first and second bridge members 32, 34 by joining knots 42, 44, respectively. The bridge line 40 is contemplated to be a flexible member comprised of a rope material that is used to secure the tree saddle 10 to a tree, as further described below with reference to FIGS. 8 and 9. The joining knots 42, 44 may also be comprised of a rope material that mechanically affixes the bridge line 40 to the first and second bridge members 32, 34. It is further contemplated that the joining knots 42, 44 can move along the body portions 32C, 34C of the first and second bridge members 32, 34 to accommodate a user secured in the tree saddle 10, and can be retained in specific positions under tension.

With further reference to FIG. 1, a belt member 50 is provided having first and second ends 50A, 50B with a body portion 50C disposed therebetween. The first end 50A of the belt member 50 is slidably coupled to the second end 50B using a friction knot 52 tied along the body portion 50C of the belt member 50. In the embodiment shown in FIG. 1, the belt member 50 includes a rope material, and is contemplated to be a flexible member. The belt member 50 is configured, such that the body portion 50C thereof is slidably received through a channel 54 disposed on the body portion 12C of the first panel 12, as further described below. In this way, the belt member 50 can freely move within the channel 54 as the belt member 50 is adjusted by the user. In use, the belt member 50 is contemplated to wrap around the waist of a user to secure the tree saddle 10 to the user, as further described below. The channel 54 is provided by a strip of material 53 disposed on an inner surface of the first panel 12 between the first and second ends 12A, 12B thereof. The belt member 50 may be a rope material that is configured to provide the expanded and cinched conditions of the tree saddle 10 when the belt member 50 is in either a slacked condition (FIG. 10), or a tightened condition (FIGS. 1 and 11), respectively. In the tightened condition, the belt member 50 draws the first and second ends 12A, 12B of the first panel 12 together around a user. As the first panel 12 is operably coupled to the second panel 14, the first and second ends 14A, 14B of the second panel 14 are also drawn together around a user to create the cinched condition of the tree saddle 10 as the belt member 50 is tightened around the user.

Figure 10:
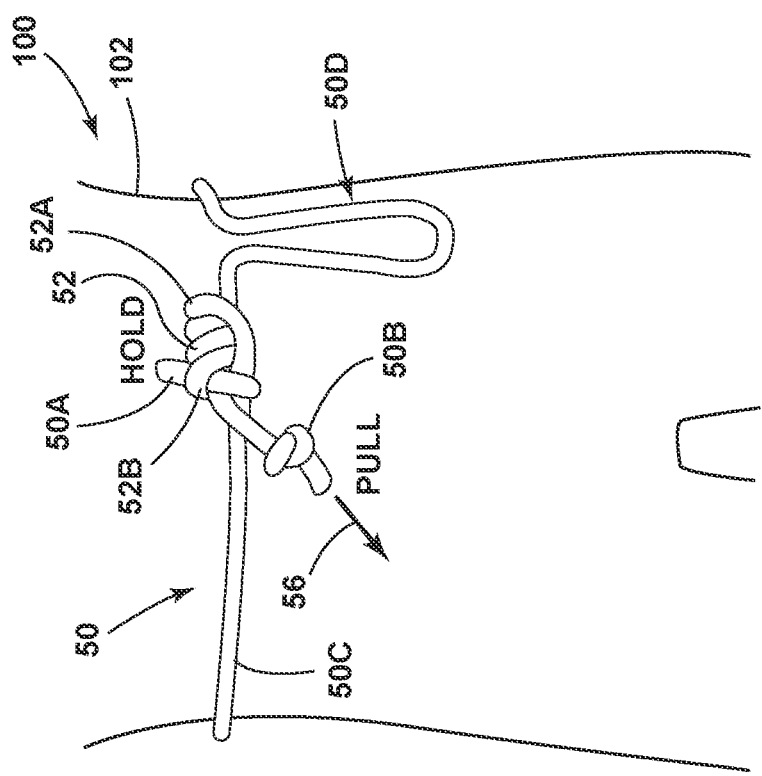
FIG. 10 is a front elevation view of a user have a rope belt coupled thereto in a slacked condition.
Figure 11:
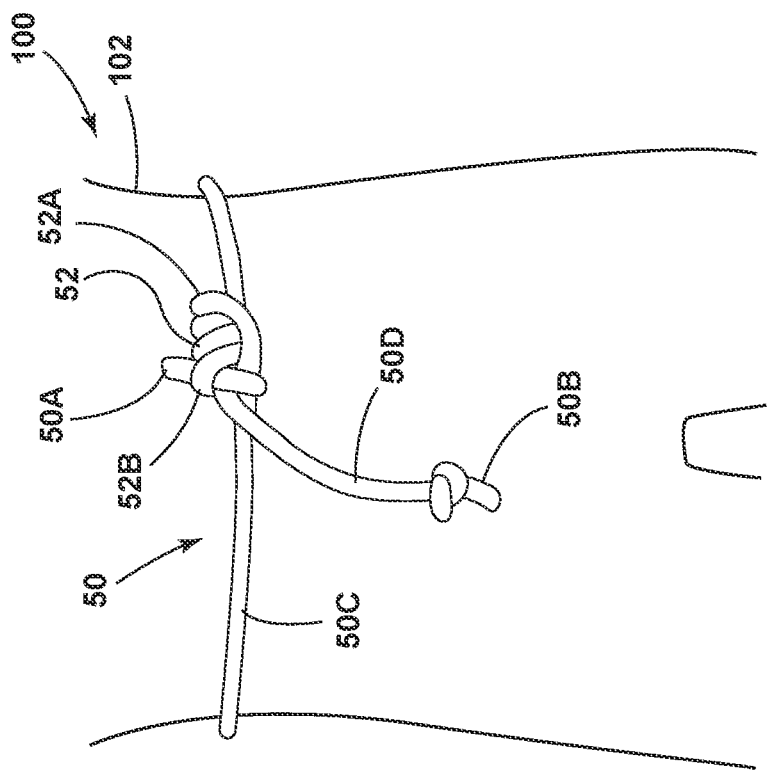
FIG. 11 is a front elevation view of the user and rope belt of FIG. 10 with the rope belt and a tightened condition.

With specific reference to FIGS. 10 and 11, the belt member 50 is shown disposed around a waist 102 of a user 100. In FIG. 10, the belt member 50 is shown in the slacked condition having a slack portion 50D disposed on a first side 52A of the friction knot 52. In FIG. 11, the belt member 50 is shown in the tightened condition, wherein the slack portion 50D is disposed on a second side 52B of the friction knot 52. In moving the belt member 50 from the slacked condition to the tightened condition, a user will hold the friction knot 52 while pulling the second end 50B of the belt member 50 away from the friction knot 52 in an exemplary direction as indicated by arrow 56. In this way, the belt member 50 not only tightens around the waist 102 of the user 100 to secure the tree saddle 10 to the user 100, but also converts the tree saddle 10 from the expanded condition to the cinched condition, as described above.

Figure 2:
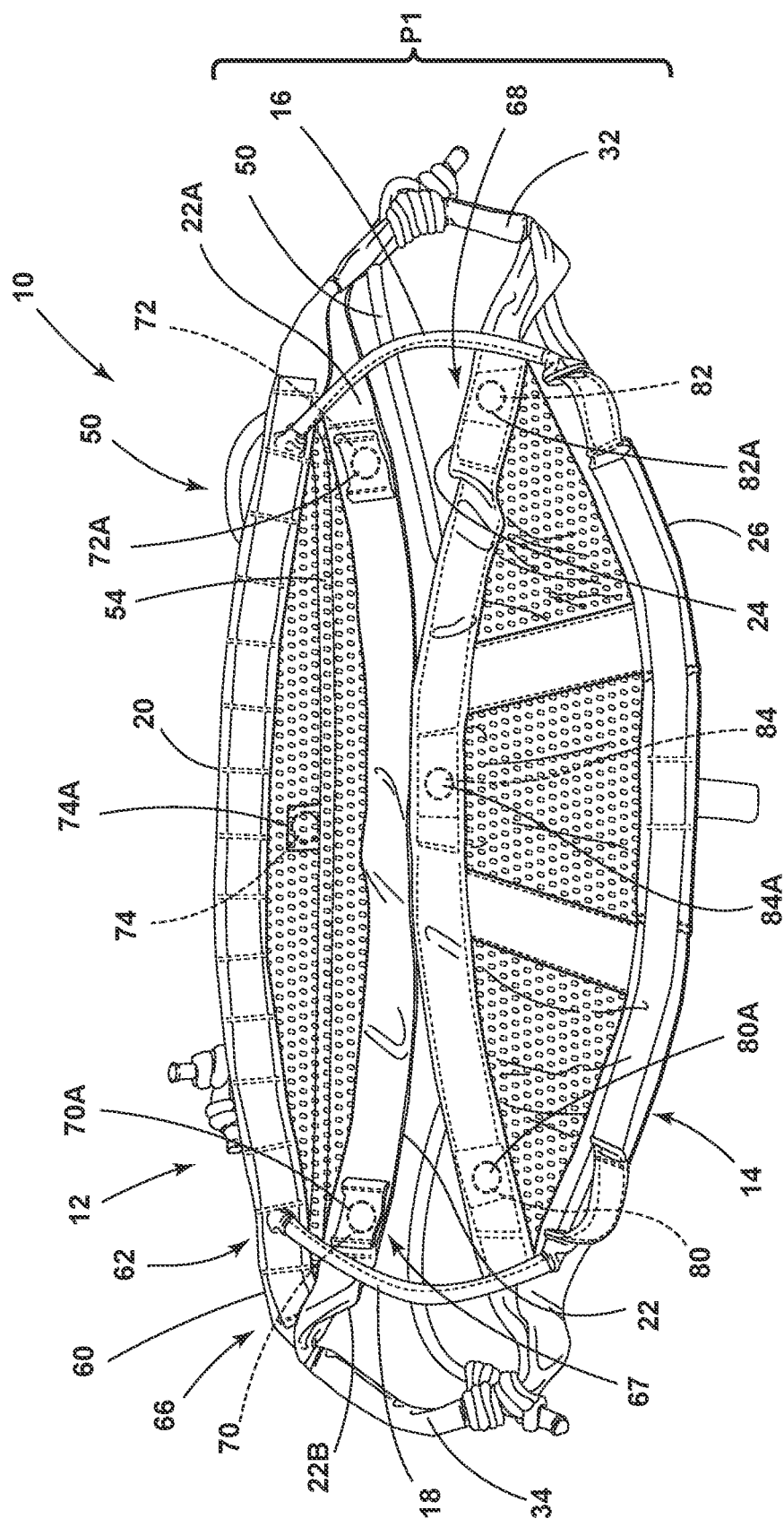
FIG. 2 is a rear plan view of the tree saddle of FIG. 1 in an uncoupled and expanded condition.

Referring now to FIG. 2, the tree saddle 10 of FIG. 1 is shown from a rear view. In the view of FIG. 2, the first and second panels 12, 14 are each shown having a configuration of an ellipse or a two-dimensional spherical polyhedron. This football-shaped configuration provides for the first and second ends 12A, 12B of the first panel 12 to have substantially equal widths that are less than a width of a middle portion of the first panel 12. Similarly, the first and second ends 14A, 14B of the second panel 14 to have substantially equal widths that are less than a width of a middle portion of the second panel 14. As further shown in FIG. 2, the upper reinforcement member 20 of the first panel 12 includes a strip of material 60 that is coupled to the upper reinforcement member 20 at select intervals to provide a plurality of loops 62 that further provide an attachment feature for the tree saddle 10. The attachment feature is contemplated to be compatible with a standardized attachment system, such as the U.S. Army's PALS (Pouch Attachment Ladder System) or the U.S. Army's MOLLE (Modular Lightweight Load-carrying Equipment) system for coupling accessories to the tree saddle 10.

As further shown in FIG. 2, the tree saddle 10 includes a magnetic coupling system 66, which will now be described. The lower reinforcement member 22 of the first panel 12 includes first and second pockets 70A, 72A housing first and second magnets 70, 72, respectively, which are shown in FIG. 2 in phantom. The first and second magnets 70, 72 are covered and concealed within the first and second pockets 70A, 72A, wherein the first and second pockets 70A, 72A may be comprised of a nylon material which covers the first and second magnets 70, 72, but still allows for attraction forces of the first and second magnets 70, 72 to penetrate therethrough. In fact, all magnets disclosed herein that are provided in a concealed manner by a pocket or other material covering are contemplated to exhibit their magnet attraction and repulsion forces through any such covering. The first panel 12 also includes an intermediate pocket 74A having an intermediate magnet 74 disposed therein. The intermediate pocket 74A is disposed on the body portion 12C of the first panel 12 between the first and second pockets 70A, 72A. In this way, the intermediate magnet 74 is disposed between first and second magnets 70, 72. The first and second magnets 70, 72 and the intermediate magnet 74 cooperate to define a first magnetic array 67 of the magnetic coupling system 66 of the tree saddle 10.

As further shown in FIG. 2, the magnetic coupling system 66 includes a second magnetic array 68 disposed along the second panel 14. In the embodiment shown in FIG. 2, the upper reinforcement member 24 of the second panel 14 includes first and second pockets 80A, 82A housing first and second magnets 80, 82, respectively, which are shown in FIG. 2 in phantom. Much like the first and second magnets 70, 72 of the first panel 12, the first and second magnets 80, 82 of the second panel 14 are covered and concealed within the first and second pockets 80A, 82A, which still allow for attraction forces of the first and second magnets 80, 82 to penetrate therethrough. The second panel 14 also includes an intermediate pocket 84A having an intermediate magnet 84 disposed therein. The intermediate pocket 84A is disposed on the body portion 14C of the second panel 14 between the first and second pockets 80A, 82A. In this way, the intermediate magnet 84 is disposed between first and second magnets 80, 82 to define the second magnetic array 68 of the magnetic coupling system 66. Thus, as shown in FIG. 2, the first and second magnetic arrays 67, 68 of the magnetic coupling system 66 are similarly shaped, such that the magnets thereof are specifically spaced-apart so that they can align with one another and magnetically couple to one another in a releasable manner, as further described below. In the embodiment shown in FIG. 2, the first and second magnetic arrays 67, 68 of the magnetic coupling system 66 of the tree saddle 10 are in an uncoupled condition, such that the first and second panels 12, 14 of the tree saddle 10 are spaced-apart from one another and only connected by the first and second connector members 16, 18 and the first and second bridge members 32, 34.

It is contemplated that any number of magnets can be disposed in the first and second magnetic arrays 67, 68 of the first and second panels 12, 14 of the magnetic coupling system 66, so long as sufficient magnetic attraction exists to releasably couple the first panel 12 to the second panel 14. It is further contemplated that the magnets can be exposed magnets which physically contact one another in a coupled condition. The magnetic forces in the magnetic coupling system 66 can also be formed between a grouping of magnets in one of the first and second magnetic arrays 67, 68, and a magnetically attractive material, such as iron, nickel, cobalt and other like metallic materials, disposed in the corresponding magnetic array. In this way, the magnets can be disposed in either the first panel 12 or the second panel 14 of the tree saddle 10, so long as the reciprocal panel includes a magnetically attractive material sufficient to form a magnetic coupling between the two. For example, the magnets 70, 72 and 74 of the first magnetic array 67 of the first panel 12 may be actual magnetic members, while the magnets 80, 82 and 84 of the second magnetic array 68 of the second panel 14 may be metal materials to which the magnets 70, 72 and 74 of the first magnetic array 67 of the first panel 12 are attracted. It is contemplated that the magnets of the present concept may be permanent magnets which are termed "permanent" in that they create their own magnetic field which persists against influences which might otherwise demagnetize them. The specific positions of the magnets and the number of magnets shown in the illustration of the magnetic coupling system 66 shown in FIG. 2 are only exemplary, and other arrangements for the magnetic arrays 67, 68 are contemplated. Further, it is contemplated that the magnetic arrays disclosed herein on any of the embodiments provided herein may be operably coupled to the respective panels, such that the magnetic arrays are removable features that can be selectively added and removed from the panels as desired by a user.

Figure 3:
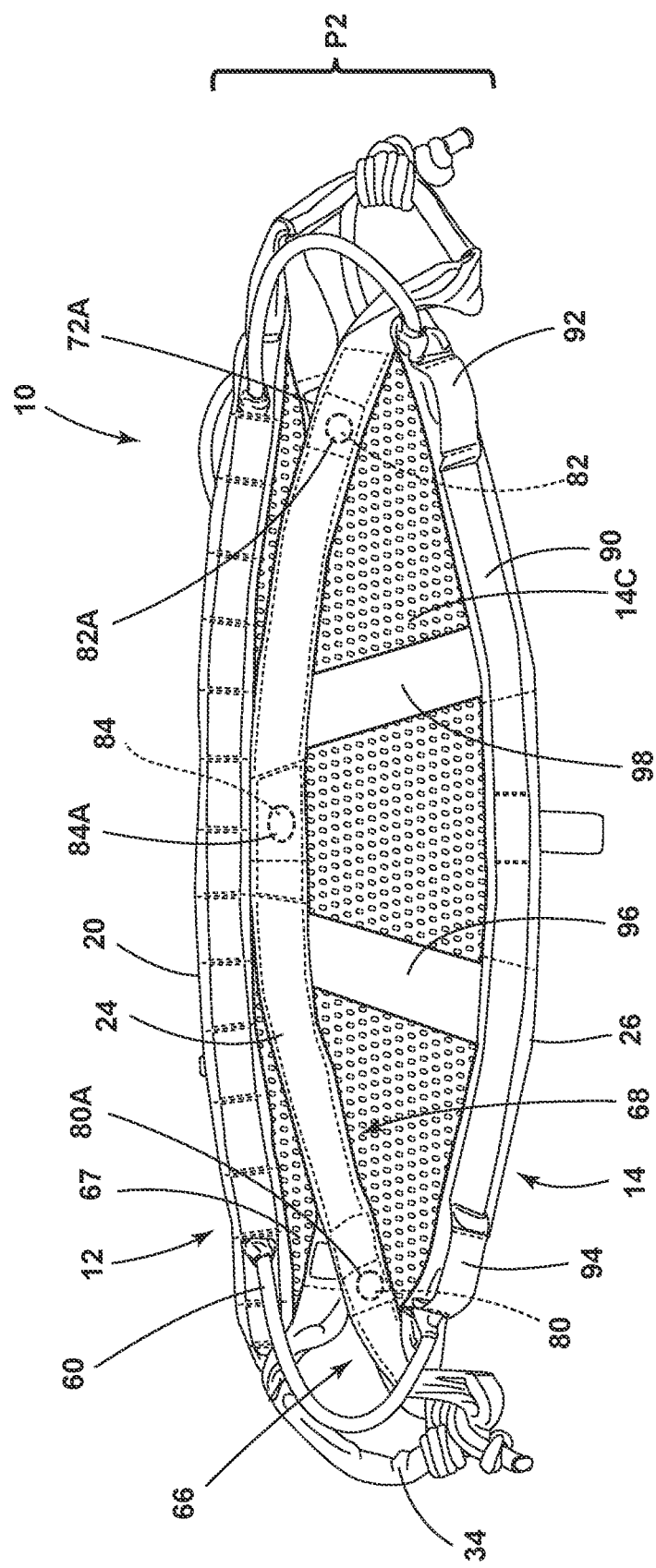
FIG. 3 is a rear plan view of the tree saddle FIG. 2 in a coupled and expanded condition.

Referring now to FIG. 3, the tree saddle 10 is shown in a coupled condition or closed condition, wherein the second panel 14 is coupled to the first panel 12. Specifically, in the coupled condition, the first magnetic array 67 of the first panel 12 is magnetically coupled to the second magnetic array 68 of the second panel 14. Thus, the magnetic coupling system 66 provides for a releasable coupling of the first panel 12 to the second panel 14 via a magnetic coupling between the first and second magnetic arrays 67, 68. In the coupled condition, it is contemplated that the magnets 70, 72 and 74 (and the associated pockets 70A, 72A and 74A) of the first panel 12 are aligned with the magnets 80, 82 and 84 (and the associated pockets 80A, 82A, 84A) of the second panel 14, such that the first and second magnetic arrays 67, 68 are fully aligned. As fully aligned, the magnets 70, 72, 74 and 80, 82, 84 of the first and second magnetic arrays 67, 68 of the magnetic coupling system 66 can magnetically couple to one another even through a number of nonmagnetic layers disposed therebetween. The nonmagnetic layers include material of the first and second panels 12, 14, such as the material of the pockets associated with the magnets as described above. In the coupled condition, a portion of the body portion 14C of the second panel 14 overlaps a portion of the body portion 12C of the first panel 12 to create a smaller overall footprint or profile for the tree saddle 10.

It is contemplated that a user will convert the tree saddle 10 from the uncoupled condition to the coupled condition when hiking out to a hunting location, climbing a tree, or any other situation where more mobility is desired. When a user fitted with the tree saddle 10 is actively moving, the slimmer profile of the coupled condition of the tree saddle 10 may be desired. With reference to FIG. 2, a first profile P1 of the tree saddle 10 is defined between the upper reinforcement member 20 of the first panel 12 and the lower reinforcement member 26 of the second panel 14 when the tree saddle 10 is in the uncoupled condition. With reference to FIG. 3, a second profile P2 of the tree saddle 10 is defined between the upper reinforcement member 20 of the first panel 12 and the lower reinforcement member 26 of the second panel 14 when the tree saddle 10 is in the coupled condition. Thus, the second profile P2 of the tree saddle 10 in the coupled condition is a much smaller profile as compared to the first profile P1, thereby allowing for better mobility of the user wearing the tree saddle 10. As further shown in FIG. 3, the lower reinforcement member 26 of the second panel 14 includes a strip of material 90 coupled thereto in such a configuration as to provide first and second loops 92, 94 disposed adjacent the respective first and second ends 26A, 26B of the lower reinforcement member 26. In use, the first and second loops 92, 94 are provided to be engaged by a user when uncoupling the second panel 14 from the first panel 12. Specifically, the first and second loops 92, 94 may be engaged by the thumbs of a user to grasp the second panel 14 and move the second panel 14 away from the first panel 12. Such intentional separating movement provides for the uncoupling of the magnets 70, 72, 74 and 80, 82, 84 of the first and second magnetic arrays 67, 68, respectively, of the magnetic coupling system 66. By uncoupling the magnets 70, 72, 74 and 80, 82, 84 of the first and second magnetic arrays 67, 68 of the magnetic coupling system 66, the second panel 14 will be deployed from the first panel 12 and spaced-apart therefrom to support a user in a hunting position, as further described below.

With further reference to FIGS. 2 and 3, vertical strips of material 96, 98 are provided on the second panel 14 along the body portion 14C thereof. The vertical strips of material 96, 98 interconnect the upper and lower reinforcement members 24, 26 to provide reinforcement and structure to the second panel 14, and further provide for weight distribution in the vertical direction along the panel 14.

Figure 4:
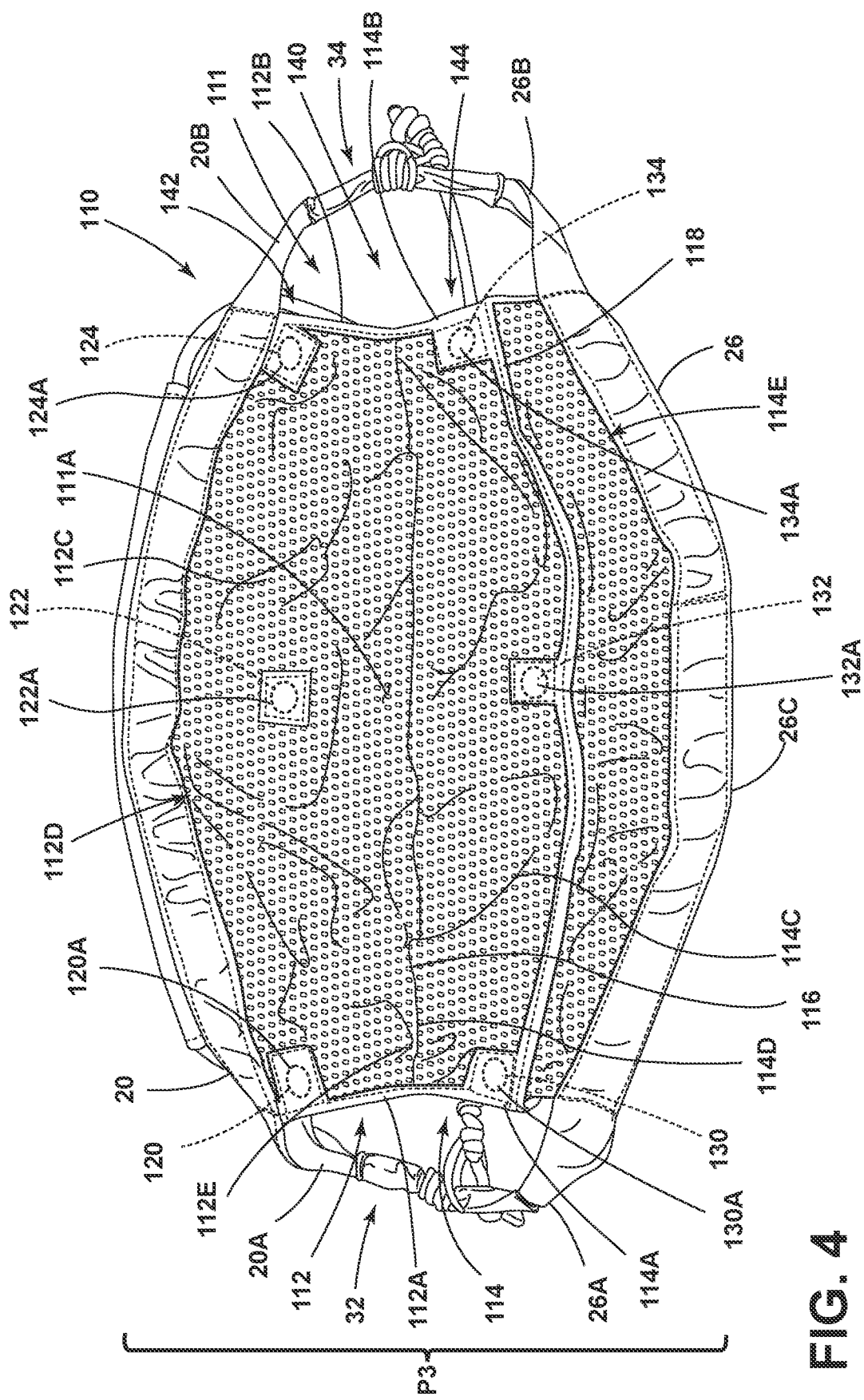
FIG. 4 is a rear plan view of a tree saddle according to another embodiment of the present concept in an uncoupled and expanded condition.

Referring now to FIG. 4, a tree saddle 110 is shown according to another embodiment of the present concept. The tree saddle 110 includes a panel 111 having first and second portions 112, 114. The tree saddle 110 includes a number of features in common with the tree saddle 10 shown in FIGS. 1-3 and described above, such that like reference numerals will be used herein to describe common features.

With further reference to FIG. 4, the first portion 112 of the panel 111 is disposed above the second portion 114 of the panel 111, and includes first and second ends 112A, 112B with a body portion 112C disposed therebetween. The first and second ends 112A, 112B are inwardly angled towards a center 111A of the panel 111. The first and second ends 112A, 112B of the first portion 112 of the panel 111 extend between an upper perimeter portion 112D to a lower perimeter portion 112E of the first portion 112 of the panel 111. An upper reinforcement member 20 is disposed along the upper perimeter portion 112D and includes first and second ends 20A, 20B with a body portion 20C disposed therebetween. The first and second ends 20A, 20B of the upper reinforcement member 20 are coupled to first and second bridge members 32, 34, respectively.

With further reference to FIG. 4, the second portion 114 of the panel 111 is disposed below the first portion 112 of the panel 111, and includes first and second ends 114A, 114B with a body portion 114C disposed therebetween. The first and second ends 114A, 114B of the second portion 114 of the panel 111 are inwardly angled towards the center 111A of the panel 111. The first and second ends 114A, 114B of the second portion 114 of the panel 111 extend inwardly from a lower perimeter portion 114E to an upper perimeter portion 114D. A lower reinforcement member 26 is disposed along the lower perimeter portion 114E and includes first and second ends 26A, 26B with a body portion 26C disposed therebetween. The first and second ends 26A, 26B of the lower reinforcement member 26 are coupled to the first and second bridge members 32, 34, respectively.

As further shown in FIG. 4, the first portion 112 of the panel 111 is operably coupled to the second portion 114 of the panel 111. Specifically, the lower perimeter portion 112E of the first portion 112 of the panel 111 is operably coupled to the upper perimeter portion 114D of the second portion 114 of the panel 111 at a seam 116 that defines a living hinge disposed between the first and second portions 112, 114 of the panel 111. A folding line 118 is sewn into the second portion 114 of the panel 111 and interconnects the first and second sides 114A, 114B of the second portion 114 of the panel 111. Similar to the seam 116, the folding line 118 also acts as a living hinge for the tree saddle 110 to guide folding movement of the panel 111, as further described below.

Figure 5:
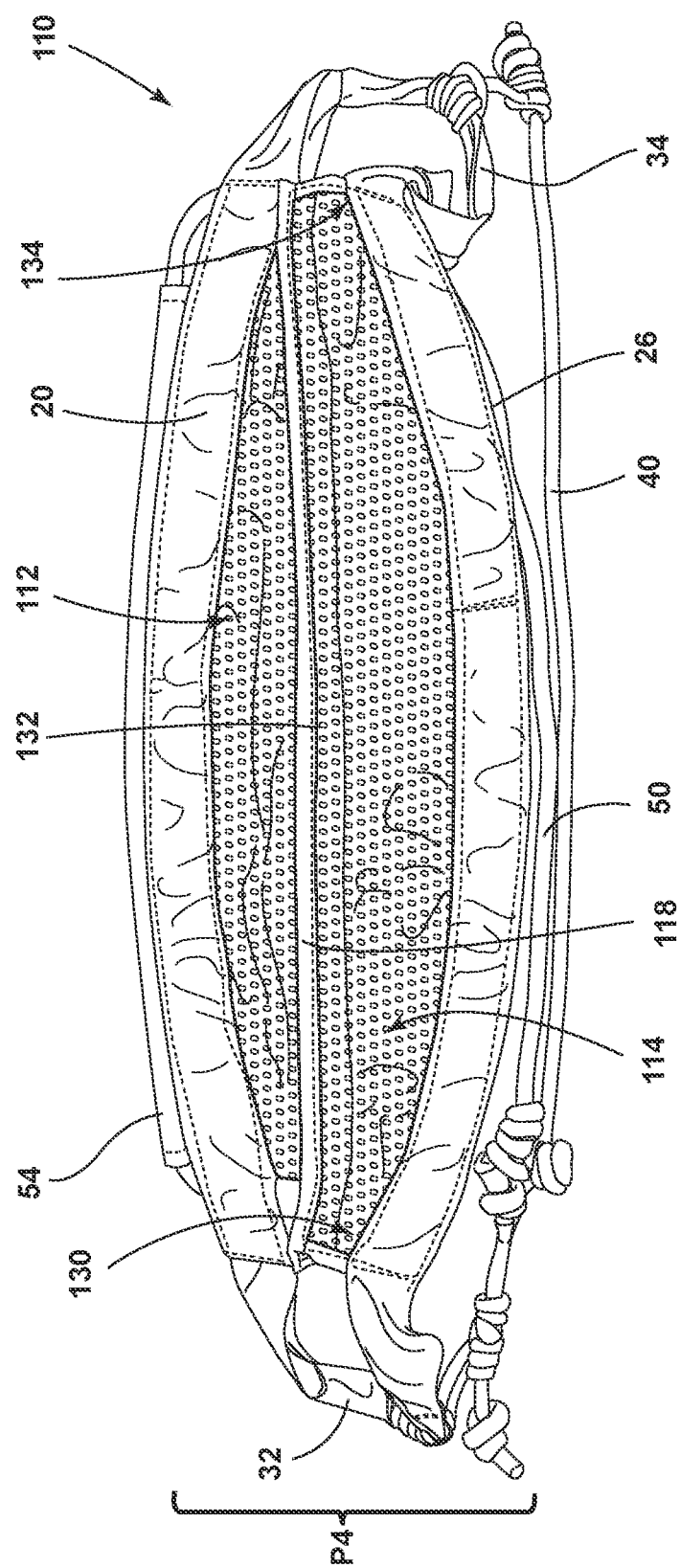
FIG. 5 is a rear plan view of the tree saddle of FIG. 4 in a coupled and expanded condition.
Figure 6:
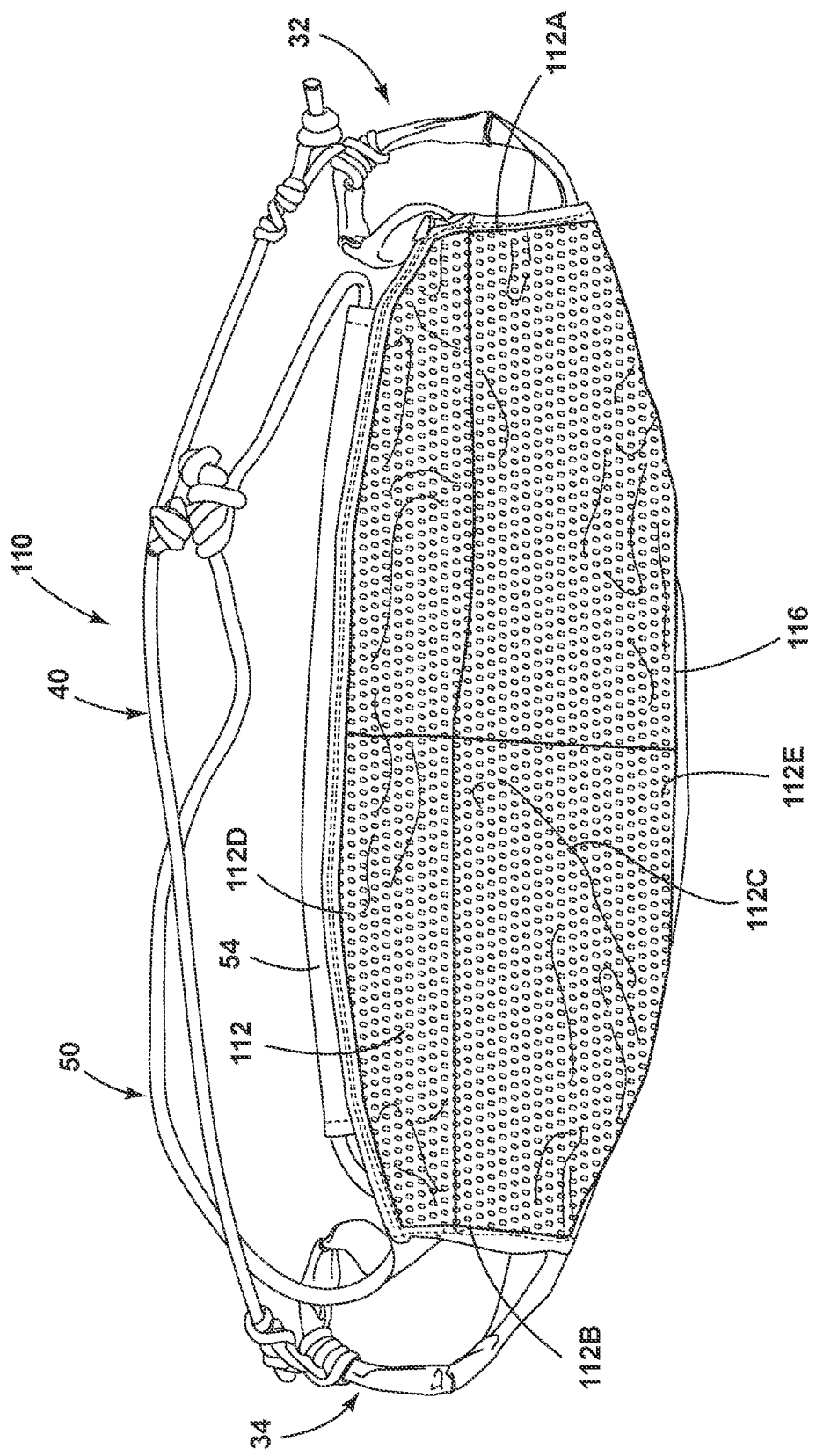
FIG. 6 is a front plan view of the tree saddle FIG. 5 in a coupled and expanded condition.

The inwardly angled first and second sides 112A, 114A and 112B, 114B provide for a V-shaped cut of the panel 111 along the seam 116, where a fold in the panel 111 is provided when the panel 111 moves from the open or uncoupled condition shown in FIG. 4 to closed or coupled condition shown in FIGS. 5 and 6. This V-shaped configuration along the sides of the panel 11 avoids bunching of material at the fold by providing a relief between the first and second portions 112, 114 of the panel 111.

As further shown in FIG. 4, pockets 120A, 122A and 124A are disposed on the first portion 112 of the panel 111, and include respective magnets 120, 122 and 124, shown in phantom. The magnets 120, 122 and 124 of the first portion 112 of the panel 111 define a first magnetic array 142 of a magnetic coupling system 140. As shown in FIG. 4, magnets 120 and 124 are disposed adjacent to the first and second sides 112A, 112B of the first portion 112 of the panel 111, with magnet 122 disposed therebetween.

Similarly, pockets 130A, 132A and 134A are disposed on the second portion 114 of the panel 111, and include respective magnets 130, 132 and 134, shown in phantom. The magnets 130, 132 and 134 of the second portion 114 of the panel 111 define a second magnetic array 144 of the magnetic coupling system 140. As shown in FIG. 4, magnets 130 and 134 are disposed adjacent to the first and second sides 114A, 114B of the second portion 114 of the panel 111, with magnet 132 disposed therebetween. In FIG. 4, the magnets 130, 132 and 134 are disposed along the folding line 118. In a similar manner as described above with reference to the magnetic coupling system 66 of tree saddle 10, the magnetic coupling system 140 of the tree saddle 110 provides for an adjustable profile configuration between open and closed conditions of the tree saddle 110. In FIG. 4, a first profile P3 of the tree saddle 110 is defined between the upper reinforcement member 20 of the first portion 112 of the panel 111 and the lower reinforcement member 26 of the second portion 114 of the panel 111 when the tree saddle 110 is in the uncoupled condition. With reference to FIG. 5, a second profile P4 of the tree saddle 110 is defined between the upper reinforcement member 20 of the first portion 112 of the panel 111 and the lower reinforcement member 26 of the second portion 114 of the panel 111 when the tree saddle 110 is in the coupled condition. Thus, the second profile P4 of the tree saddle 110 in the coupled condition is a much smaller profile than the first profile P3 shown in FIG. 4, thereby allowing for better mobility of the user wearing the tree saddle 110.

In moving from the uncoupled condition to the coupled condition, or from the open condition to the closed condition as shown from FIG. 4 to FIG. 5, a user will move the first and second magnetic arrays towards one another, such that the panel 111 will fold onto itself at the seam 116 and further fold along the fold line 118 until the respective magnets 130, 132 and 134 of the second magnetic array 144 align with the magnets 120, 122 and 124 of the first magnetic array 142 and thereby magnetically couple to one another in a releasable manner.

Figure 7:
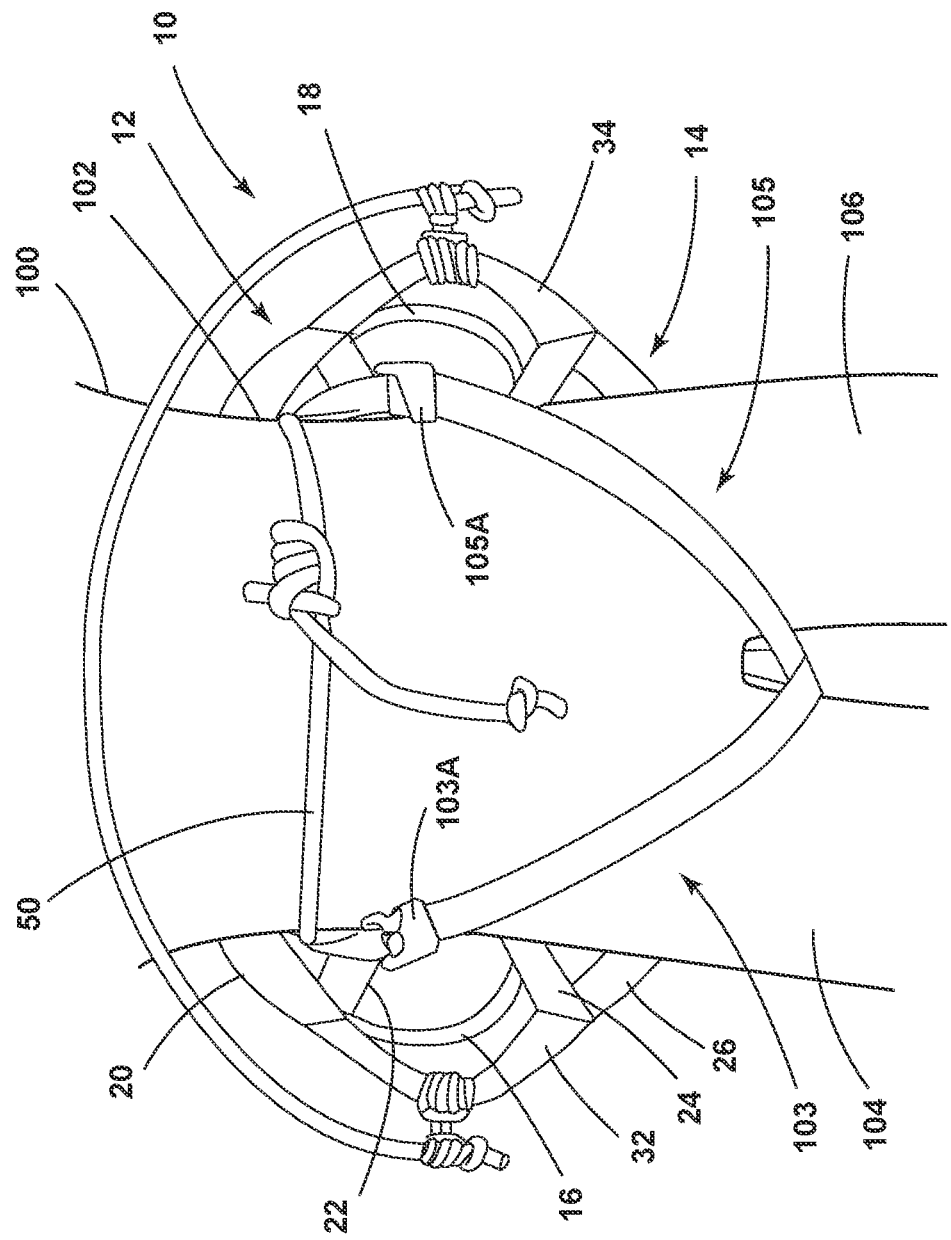
FIG. 7 is a front plan view of the tree saddle of FIG. 1 as being secured to a user.

Referring now to FIG. 7, the tree saddle 10 is shown disposed around a user 100 at a waist portion 102 thereof. Specifically, the belt member 50 is secured around the waist portion 102 of the user 100 in the tightened condition. With the belt member 50 in the tightened condition, the tree saddle 10 is contemplated to be in the cinched condition. In the embodiment of FIG. 7, first and second removable leg straps 103, 105 are shown wrapped around legs 104, 106, respectively, of the user 100. The removable leg straps 103, 105 each include respective engagement features 103A, 105A that define hook members that can removably hook to the first panel 12 of the tree saddle 10. The first and second removable leg straps 103, 105 are contemplated to be used on both the tree saddle 10 or the tree saddle 110 discussed above. The first and second removable leg straps 103, 105 are contemplated to connected together at a removable connection point disposed on the bottom-center-rear of panel 111 or the second panel 14 depending on which tree saddle is being used.

Figure 8:
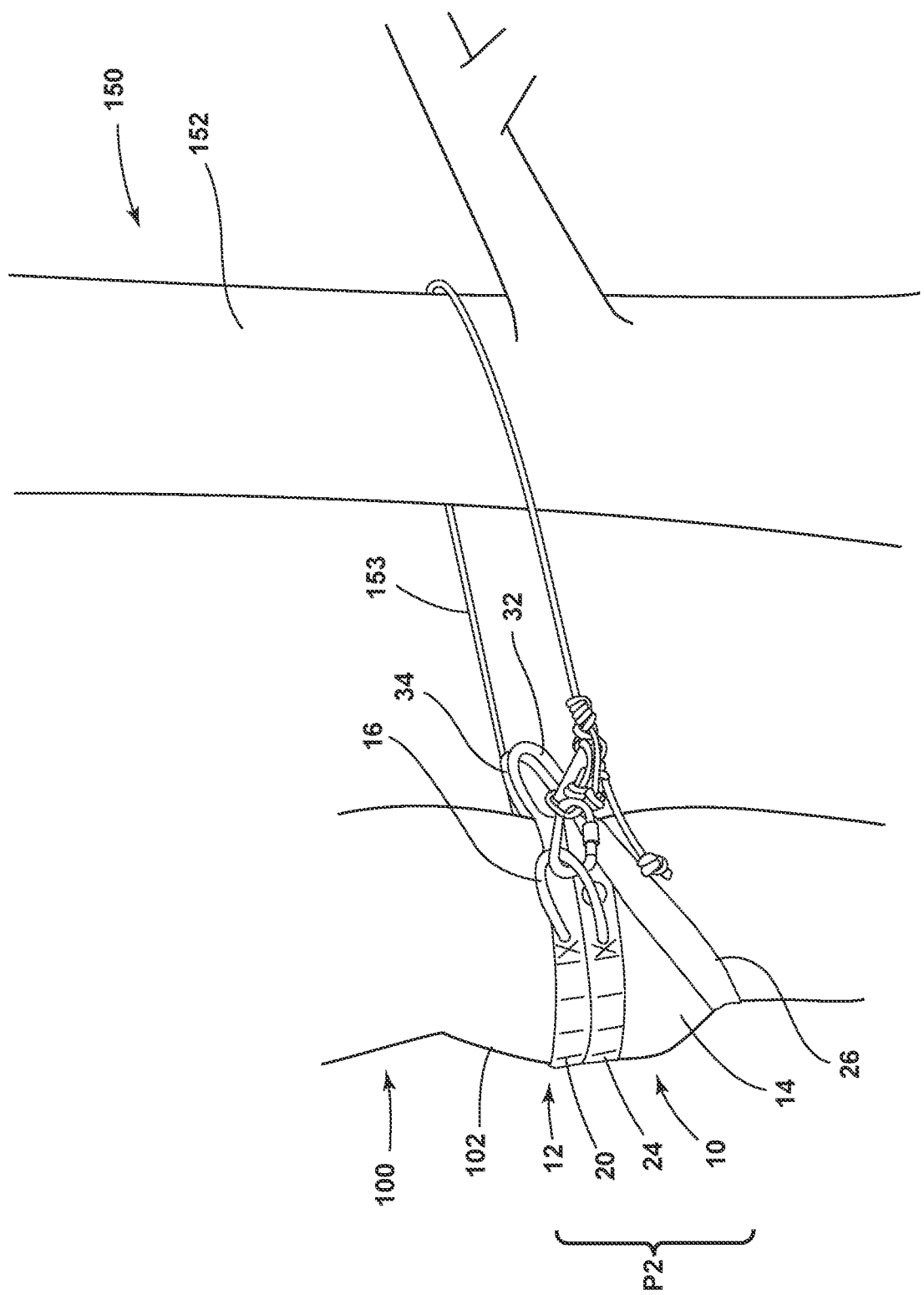
FIG. 8 is a side elevation view of the tree saddle and user of FIG. 7 as securing the tree saddle to the trunk of a tree with the tree saddle in the coupled condition.
Figure 9:
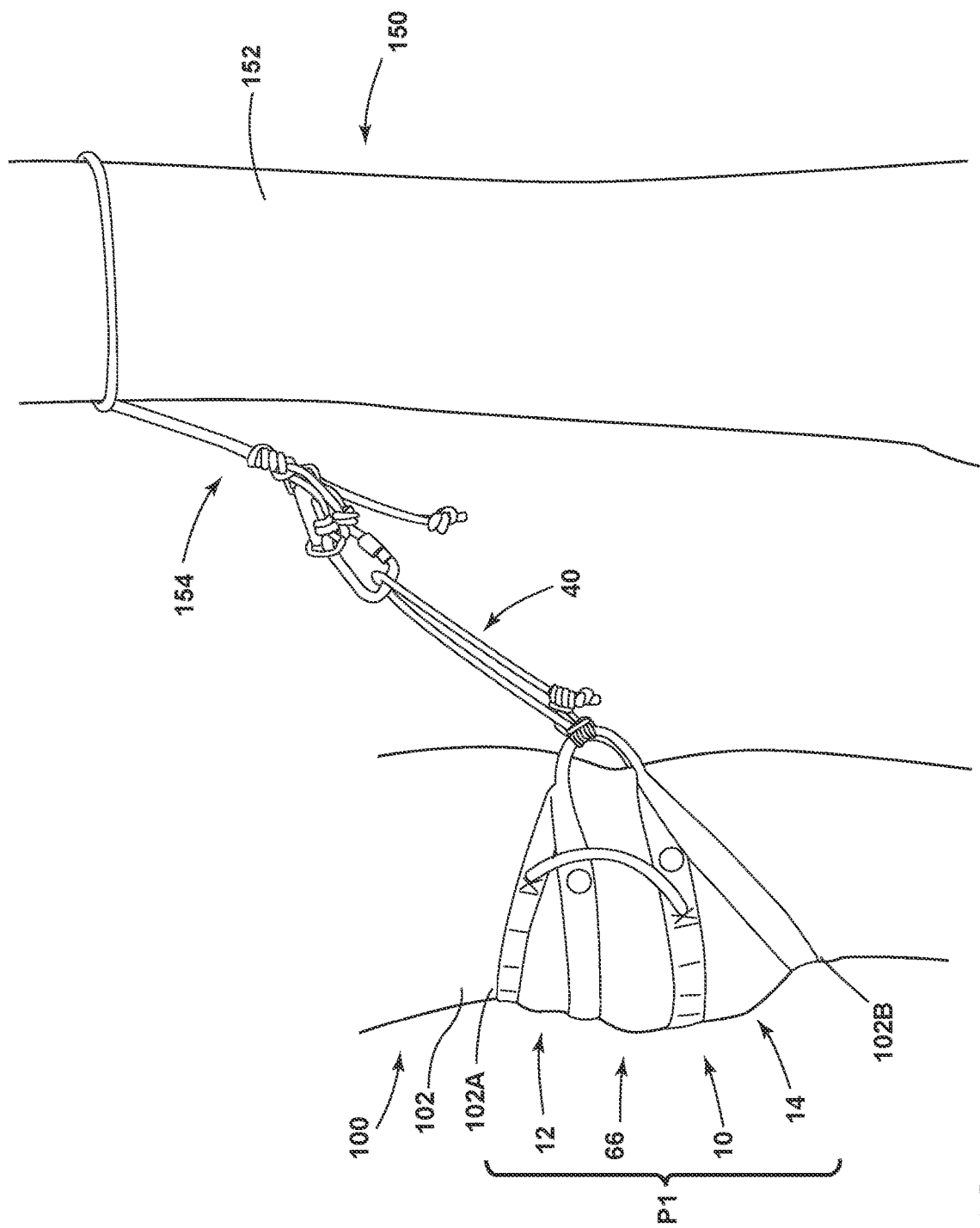
FIG. 9 is a side elevation view of the tree saddle and user of FIG. 8 with the tree saddle in the uncoupled condition.

Referring now to FIG. 8, the user 100 is shown with the tree saddle 10 in the coupled and cinched condition, with a lineman's rope 153 wrapped around the trunk 152 of a tree 150. The lineman's rope 153 is provided to assist the user 100 in climbing the tree 150 and may be coupled to the tree saddle 10 at the first and second connecting members 16, 18 on opposite sides of the tree saddle 10. The lineman's rope 153 is contemplated for use with either tree saddle 10, 110. In the coupled condition, the tree saddle 10 has the slimmer profile P2, as discussed above with reference to FIG. 3. Referring now to FIG. 9, the user 102 is shown with the tree saddle 10 in the uncoupled and cinched condition, wherein the magnets (discussed above with reference to FIG. 2) of the magnetic coupling system 66 are contemplated to be uncoupled from one another to create the larger profile P1 which better supports the user 100 with the first and second panels 12, 14 in a spaced-apart configuration. Specifically, the first panel 12 of the tree saddle 10 supports the user 100 at the user's lower back 102A, while the second panel 14 of the tree saddle 10 supports the user 100 at the user's buttocks and thigh region 102B. This support spread provided by the first profile P1 of the tree saddle 10 in the uncoupled condition provides significant support for the user 100 for hunting activities when supported from a tree. In FIG. 9, the user 100 is coupled to the tree trunk 152 of the tree 150 by the bridge line 40 that is further coupled a tether 154. In the position shown in FIG. 9, the user 100 is supported by the tree saddle 10 for hunting activities.

According to one aspect of the present disclosure, a tree saddle includes at least one panel having first and second ends with a body portion disposed therebetween. A magnetic coupling system includes a first magnetic array disposed on a first portion of the at least one panel, and a second magnetic array disposed on a second portion of the at least one panel. The tree saddle is operable between coupled and uncoupled conditions. The first magnetic array is magnetically coupled to the second magnetic array when the tree saddle is in the coupled condition. The first magnetic array is magnetically uncoupled from the second magnetic array when the tree saddle is in the uncoupled condition. The tree saddle includes a first profile when the tree saddle is in the uncoupled condition that is greater than a second profile of the tree saddle when the tree saddle is in the coupled condition.

According to another aspect of the disclosure, the at least one panel includes first and second panels each having first and second ends with respective body portions disposed therebetween.

According to another aspect of the disclosure, the first magnetic array is disposed on the first panel, and the second magnetic array disposed on the second panel.

According to another aspect of the disclosure, the first panel includes a channel disposed between the first and second ends of the first panel.

According to another aspect of the disclosure, a belt member is slidably received in the channel of the first panel. The belt member includes first and second ends with a body portion disposed therebetween.

According to another aspect of the disclosure, the first end of the belt member is slidably coupled to the second end of the belt member.

According to another aspect of the disclosure, the belt member is operable between slacked and tightened conditions. The first and second ends of the first panel are drawn towards one another as the belt member moves from the slacked condition to the tightened condition.

According to another aspect of the disclosure, the belt member is comprised of a rope material.

According to another aspect of the disclosure, the at least one panel includes upper and lower portions with a seam disposed therebetween.

According to another aspect of the disclosure, the first magnetic array of the magnetic coupling system is disposed on the upper portion of the at least one panel, and the second magnetic array of the magnetic coupling system is disposed on the lower portion of the at least one panel.

According to another aspect of the disclosure, the seam is disposed between the first and second ends of the at least one panel, and the seam defines a first living hinge disposed between the upper and lower portions of the at least one panel.

According to another aspect of the disclosure, a folding line disposed between first and second ends of the at least one panel on the lower portion of the at least one panel.

According to another aspect of the disclosure, the folding line defines a second living hinge disposed along the lower portion of the at least one panel.

According to another aspect of the disclosure, the at least one panel folds along the first and second living hinges as the tree saddle moves between the coupled and uncoupled conditions.

According to another aspect of the disclosure, a belt member slidably received in a channel of the at least one panel. The belt member includes first and second ends with a body portion disposed therebetween.

According to another aspect of the disclosure, the first end of the belt member is slidably coupled to the second end using a friction knot tied along the body portion of the belt member.

According to another aspect of the disclosure, the belt member is operable between slacked and tightened conditions. The first and second ends of the at least one panel are drawn towards one another as the belt member moves from the slacked condition to the tightened condition.

According to another aspect of the disclosure, the belt member is comprised of a rope material.

According to another aspect of the disclosure, the channel includes a strip of material disposed on an inner surface of the at least one panel.

According to yet another aspect of the disclosure, the channel is positioned on the upper portion of the at least one panel between the first and second ends thereof.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tree saddle for supporting a lower back and thigh region of a user, comprising:
    a first panel having a first end, a second end, a body portion disposed therebetween, an inner surface, and an outer surface, the first panel being configured to support the lower back of the user at the inner surface of the first panel;
    a second panel having a first end, a second end, a body portion disposed therebetween, an inner surface, and an outer surface, the second panel being configured to selectively support the thigh region of the user at the inner surface of the second panel;
    a magnetic coupling system that includes a first magnetic array disposed on the first panel and a second magnetic array disposed on the second panel, wherein the tree saddle is operable between a coupled condition, wherein in the coupled condition, the first magnetic array is magnetically coupled to the second magnetic array, and an uncoupled condition, wherein in the uncoupled condition, the second magnetic array is magnetically uncoupled from the first magnetic array, and wherein, in the uncoupled condition of the tree saddle, the inner surface of the first panel is configured to face the user, and the second panel is operable to deploy away from the first panel from a first position, wherein in the first position, the second panel overlaps a portion of the first panel and the inner surface of the second panel is configured to face the user, to a second position, wherein in the second position, the second panel is spaced-apart from the first panel and the inner surface of the second panel is configured to face the user, and further wherein the tree saddle includes a first profile when the tree saddle is in the uncoupled condition and the second panel is in the second position that is greater than a second profile of the tree saddle when the tree saddle is in the coupled condition; and
    a belt member slidably received within a channel of the first panel, wherein the belt member is configured to wrap around a waist of the user and is operable between slacked and tightened conditions.

2. The tree saddle of claim 1, wherein the belt member includes first and second ends with a body portion disposed therebetween.

3. The tree saddle of claim 2, wherein the first end of the belt member is slidably coupled to the second end of the belt member.

4. The tree saddle of claim 2, wherein the first and second ends of the first panel are drawn towards one another as the belt member moves from the slacked condition to the tightened condition.

5. The tree saddle of claim 2, wherein the belt member is comprised of a rope material.

* * * * *